March 14, 1961 P. RAYMOND 2,974,874
GUN FOR PROJECTING PLASTIC PRODUCTS
Filed Oct. 19, 1955 3 Sheets-Sheet 1
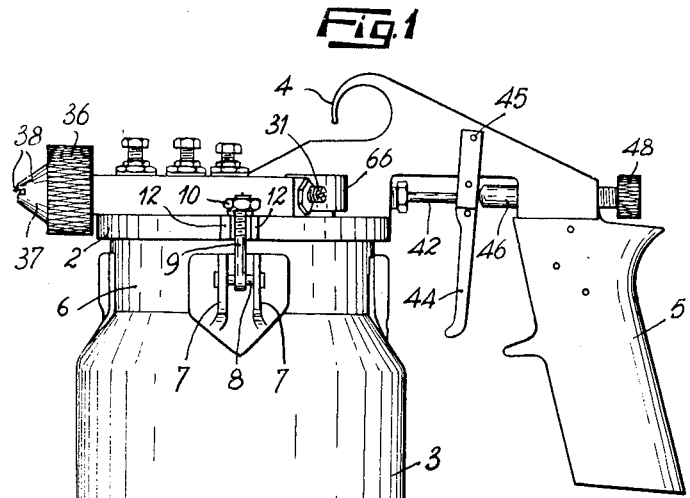
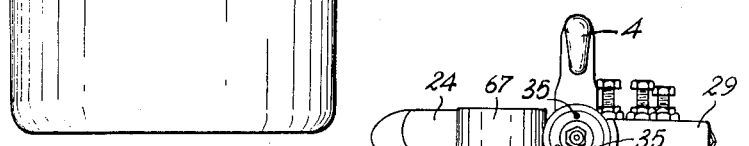
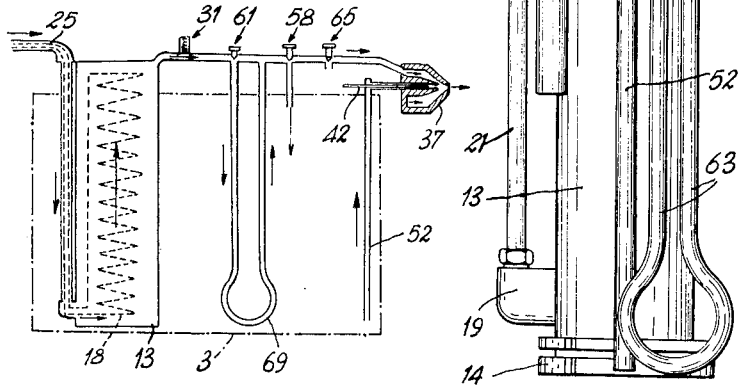

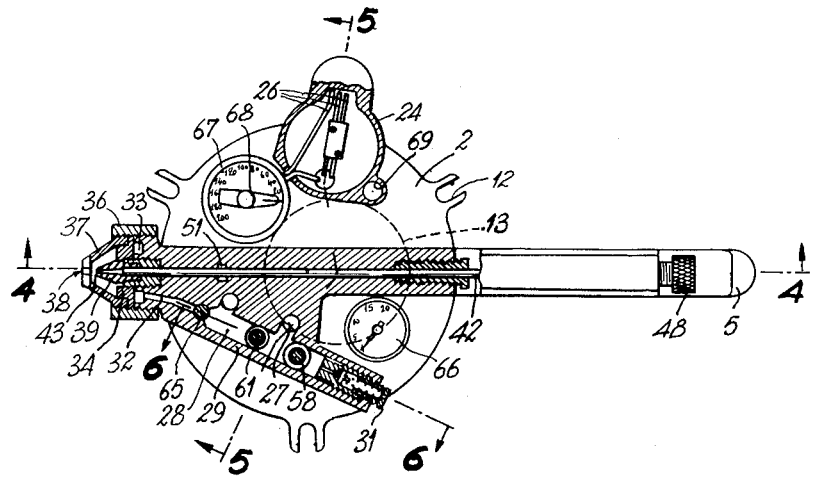
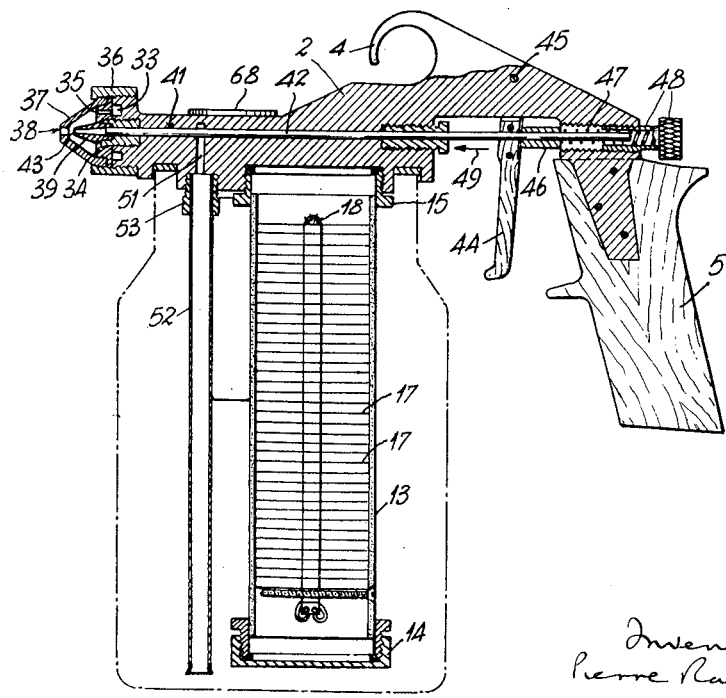

March 14, 1961  P. RAYMOND  2,974,874
GUN FOR PROJECTING PLASTIC PRODUCTS
Filed Oct. 19, 1955  3 Sheets-Sheet 3
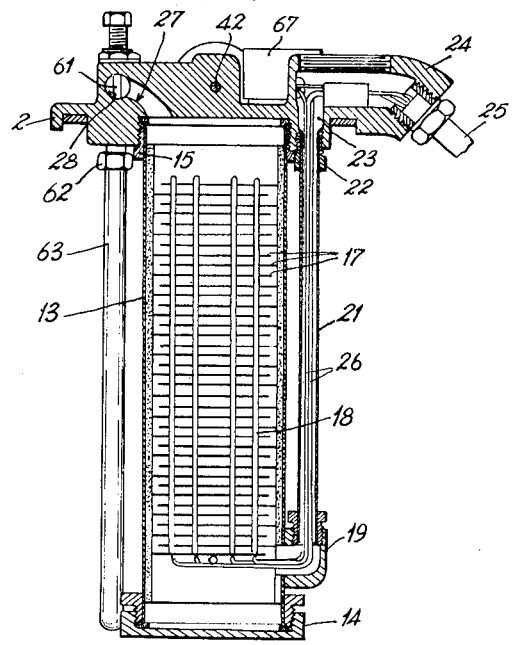
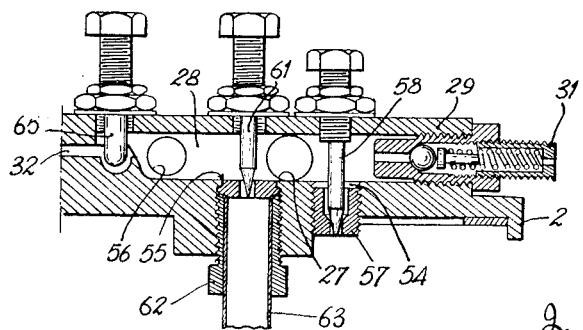
Inventor
Pierre Raymond
By
Michael S. Striker
Attorney United States Patent Office 2,974,874
Patented Mar. 14, 1961

2,974,874

GUN FOR PROJECTING PLASTIC PRODUCTS

Pierre Raymond, Grenoble, France, assignor to Protectal, Paris, France, a company Filed Oct. 19, 1955, Ser. No. 541,507

Claims priority, application France Oct. 22, 1954

9 Claims. (Cl. 239—139)

Until recent years, the coating of supports of all kinds with various products, such as paints, anti-rust products, washes, adhesives, waxy products, pitches, bitumens and all plastic materials, has taken place in the cold. The products were rendered liquid by dissolving them in solvents or by emulsifying them in liquids and were applied to the support either by means of a gun or by means of a brush, and the solvents or emulsifiers were allowed to evaporate.

This method is attended by serious disadvantages residing principally in the following:

The solvents are lost, since they must evaporate after application of the product to the support. In addition to the loss resulting therefrom there is the danger of toxic effects on the personnel in the case of some solvents.

The layers of product applied dry slowly, which results in a loss of time. If the solvents employed are very volatile, so that more rapid drying is possible, the layers of product on the support are likely to become porous, which then necessitates the application of a large number of successive layers separated from one another by a complete drying.

The products to be applied must be soluble in at least one solvent in order that they may be brought into the liquid phase.

Now, there exist protective products which, although possessing good properties, especially in regard to their resistance, could not be utilised by reason of their complete insolubility.

Since all solvents have some odour, the use of products dissolved in solvents has been impossible in the food industry, in which it would have been desirable to provide some products with a coating.

In order to obviate the disadvantages, devices have been developed for projecting by means of a gun, not products rendered liquid by dissolution in solvents or by emulsification in appropriate liquids, but products as such, brought into the liquid state by heat.

However, these devices have a number of disadvantages including in particular high cost, considerable weight and difficulty in draining, more especially, the pipes thereof.

The present invention has for its object to provide a gun for projecting plastic products of the aforesaid type, which has the property of being particularly easy to handle, so that it may be employed in all types of industries. Thus, this gun may be employed to project the following products:

Paints having a low solvent content or even containing no solvent.

Paraffins, natural or artificial waxes and all complex compounds thereof.

Products for the protection of foodstuffs (cheese, fruit, eggs, meat, etc.).

Anti-rust or metal-protecting products.

Thermoplastic or polymerisable materials.

Adhesives insoluble in solvents but capable of being activated by heat.

To this end, the gun according to the invention comprises essentially a head which is mounted in fluid-tight but readily detachable fashion on a reservoir containing the product to be projected and which supports a heater extending down into the said reservoir consisting of a metal jacket in which are disposed electric resistors extending through baffles which cause the air under pressure admitted into the base of the said jacket to follow a zigzag path in contact with the said resistors which bring it to the temperature necessary for melting the product, the hot air leaving the heater through a duct of adjustable cross-section in a passage, from which some of this air is sent into the reservoir, with the double object of heating the product and exerting thereon a pressure to cause it to rise through a descending tube which directs it to the atomising nozzle, while another part of the said hot air is admitted directely to the said nozzle in order to effect the atomisation and projection of the product, while another part of the said air may, if desired, be admitted through a duct of adjustable cross-section into a tube forming a superheating coil which dips into the material contained in the reservoir.

The head of the said gun, which preferably consists of cast metallic material, is provided with a manometer for indicating the pressure of the hot air, a thermometer for indicating its temperature, and an adjustable thermostat which opens the electric circuit feeding the resistors when the air has reached the temperature necessary for melting the product to be projected.

The head of the said gun may naturally be secured to the reservoir containing the material to be projected in any known manner. However, in order that the head may be very rapidly fitted on the reservoir and removed therefrom, it is advantageously secured by arms of adjustable length which are pivotally secured to the reservoir and engage in lugs provided on the head of the gun.

With regard to the connection between the head of the gun and the compressor, it is provided by a simple pipe of flexible material through which there may be passed, not only the air supplied by the compressor, but also the electric conductors to which the heating resistors are connected.

The accompanying drawings illustrate by way of non-limitative example a constructional form of a gun according to the invention for projecting thermoplastic products.

Figure 1 is a general view in side elevation.

Figure 2 is an elevational view of the head of the gun and the elements provided thereon.

Figure 3 shows the said head in overhead plan view, partly in horizontal section.

Figures 4 and 5 are views thereof in vertical section along the lines 4—4 and 5—5 of Figure 3 respectively.

Figure 6 is a fragmentary sectional view along the line 6—6 of Figure 3 on a larger scale.

Figure 7 is a diagrammatic view showing the circulation of air in the said gun.

The said projection gun has the general form shown in Figure 1, comprising a head 2 and a reservoir 3. The said head 2 which will hereinafter be described in detail, consists of a light metal alloy and is manufactured by casting. It forms a hook 4 by means of which the gun may be hung on any device and is provided with handle 5 consisting of a material which is a non-conductor of heat, by means of which the gun can readily be held in the hand despite the temperature at which it is used.

The reservoir 3 consists of a metal container which may be of cylindrical form as shown in Figure 1. The said reservoir 3, which contains the material to be projected terminated at the top in a neck 6 provided with three forks 7 supporting pins 8, on which there are pivotally mounted rods 9 screwthreaded at their ends to receive nuts 10 permitting of readily closing the gun by engagement of the rods 9 in corresponding lugs 12 provided on the head 2 of the gun.

The said head 2 serves in the first place as a support for the heater disposed within the reservoir 3. The said heater consists of a cylindrical metal jacket 13 closed at the bottom by a plug 14 and open but fixed at the top by a ring 15 in a threaded aperture in a boss 16 provided on the lower face of the head 2. Disposed within the said jacket 13 are a number of baffles 17, through which there extend rectilinear electric resistors 18.

The jacket 13 comprises close to its base a boss 19 in which there is formed a bore leading into the interior of the jacket, and into which there leads a tube 21 which is secured at the top by a nut 22 in a bore formed in the boss 16. The said bore communicates, as shown in Figure 5, with a bore 23 formed in a boss 24 provided on the outer face of the head 2. The said bore is in communication with the flexible pipe 25 which is connected at one end to the said boss 24 and at its other end to the compressor. The said pipe 25 permits the passage not only of the compressed air supplied by the said compressor but also of the electric conductors 26, to which the electric resistors 18 are connected. Thus, the electrical conductors 26 are located within the lumens of the tubes 21 and 25 so that they will be engaged by the fluid which flows along these tubes.

It will thus be appreciated that the air supplied by the compressor is admitted through the tube 21 to the base of the jacket 13, that is to say, of the heater, the air under pressure rises within the said jacket along a zigzag path imparted thereto by the baffles 17. On reaching the top of the jacket 13, the air is thus brought to a high, adjustable temperature which depends upon the nature of the product contained in the reservoir 3 outside the jacket 13.

At the top of the jacket 13, the said hot air escapes through an orifice 27 into a passage 28 formed in a boss 29 provided on the upper face of the head 2. The said passage is closed at its rear end by a safety valve 31, while it leads at its forward end into a bore 32 through which it communicates with an annular chamber 33 provided in the forward face of the boss 29. The said boss supports in its forward face the projection nozzle, which comprises a washer 34 closing the said chamber but having a number of holes 35, for example, three, to permit the escape of the hot air necessary for the projection of the product. The said washer 35 is covered by a ring 36 which holds in position the nozzle proper 37, which has either a hole 38 or a slot in its central portion. Disposed behind the said hole 38 and in axial alignment therewith is the duct through which the material to be projected is admitted to the nozzle. The said duct, which is disposed in alignment with a bore 41 formed in the boss 29, also provides a passage for a rectilinear cylindrical rod 42 terminating in a point 43. The said rod 42, which extends through the entire boss 29, projects out of the latter on the side of the handle 5, and extends through a bore formed in a trigger 44 hingeably connected at 45 to the head of the gun, and it supports a shouldered portion 46 serving as a bearing point, on the one hand for the trigger 44 and on the other hand for a spring 47 which is disposed concentrically around the said rod 42 and bears against the inner face of a screw-threaded plug 48 adjustably screwed in a threaded recess formed for this purpose in the head 2.

It will thus the appreciated that the spring 47 bearing fixedly against the inner end of the plug 48 and bearing movably against the shoulder 46 tends constantly to move the rod 42 in the direction of the arrow 49 in Figure 4 and therefore to close the duct 39 by means of the point of the said rod 42.

Leading into the passage 41 through which the said rod 42 extends is a bore 51 affording communication between the said passage 41 and a tube 52 which is secured by a nut 53 on the boss 16 of the head 2 and leads at its lower end to a point close to the bottom of the reservoir 3.

There lead into the passage 28 formed in the boss 29 of the head 2, in addition to the bore 27 communicating with the heater 13, three other bores 54, 55 and 56 respectively. The first bore 54 is threaded and there is screwed therein a tubular member 57 constituting the seat of a pointed screw 58, the head of which lies outside the upper face of the head 2 of the gun. When the seat 57 is open the passage 28 is in communication through the bore 54 with the inner chamber formed by the reservoir 3. Hot air entering the passage 28 through the bore 27 therefore penetrates into the interior of the reservoir 3, thus producing a pressure on the material to be projected and causing it to rise through the tube 52 into the passage 41.

The bore 55 leading into the passage 28 receives, on the one hand, a seat 59 on to which is urged a pointed screw 61 controllable from outside the head 2. The bore 55 receives on the other hand, below the said seat 59, a nut 62 by means of which there can be secured on the head 2 a tube 63 extending to the bottom of the reservoir 3 and then rising to the head 2, to which it is secured at its end by another nut 64 and at which it extends into the passage 28 through the bore 56.

It will thus be appreciated that if the seat 59 is opened by disengagement of the pointed screw 61, hot air arriving in the passage 28 through the bore 27 enters the tube 63, flows therethrough and returns to the passage 28 through the bore 56. This air, in circulating through the tube 63 and therefore through the mass of material contained in the reservoir 3, superheats the said material.

Finally, it is to be noted that the point of a screw 65 extends across the passage 28 at the end thereof adjacent the bore 32, the said screw being operable from the outside to adjust the flow of hot air through the annular groove 33 and therefore through the nozzle.

Disposed on the outer face of the head 2 of the gun, in addition to the heads of the screws 58, 61 and 65 which permit certain adjustments of the gun, are the dial 66 of a manometer indicating the pressure of the hot air in the reservoir 3, the dial 67 of a thermometer indicating the temperature of the said air, and the adjustment plug 68 of a thermostat for adjusting the temperature of the said air by opening the electric circuit feeding the electric resistors 18 when the air reaches the temperature necessary for melting and projecting the material contained in the reservoir 3.

Finally, there is formed in the head 2 of the gun an orifice 69 which when closed by a removable plug, permits of filling the reservoir without the head 2 having to be removed.

The operation of the said gun will readily be understood. When the material contained in the reservoir 3 has been brought to its melting temperature through the hot air sent into the reservoir through the flexible pipe 25, the bore 23, the tube 21, the heater 13, the bore 27, the passage 28 and the bore 54, the said material is caused by the perssure of the hot air on its surface in the reservoir 3 to rise through the tube 52 and the bore 51 into the passage 41, through which it flows concentrically to the rod 42 and from which it is delivered to the ouside through the duct 39 if the rod 42 has been retracted by operation of the trigger 44. At the same time, hot air leaving the passage 28 through the bore 32 enters the annular groove 33 and escapes therefrom through the holes 35, so that the air enters the interior of the nozzle 37 concentrically in relation to the molten material. This material is thus atomised and projected to the outside through the passage 38 of the nozzle.

It will be obvious that the invention is not limited to the single form of construction of the said gun which has hereinbefore been described by way of example, but that it covers all modified forms thereof.

Thus, the heater, instead of being disposed within the reservoir, may be disposed outside the latter, in which case it may be supported by the reservoir or fixed on the compressor or other source of compressed air.

Thus, more especially in the case of the hot projection of polymerisable products, the head of the gun is fitted to two reservoirs, one of which contains the polymerisable product to be projected, while the other contains a hardening product, the gun then being provided with two nozzles for the simultaneous and intimate projection of these products.

Moreover, the gun according to the invention may be used in the case of the electrostatic projection of certain products. The gun is then provided with an electrostatic emitter intended to charge the molecules of projected products with electricity and to ensure distribution thereof over the surfaces to be coated.

I claim:

1. In a sprayer, in combination, wall means defining a hollow elongated enclosure having opposite closed ends and respectively formed adjacent said ends with an inlet leading into and an outlet leading out of said enclosure; a container adapted to contain material to be sprayed, said container being substantially larger than and containing said enclosure with the material in the container contacting the exterior surface of said wall means; fluid supply means communicating with said inlet nad supplying a fluid to said enclosure in direct contact with said wall means, the fluid flowing through the interior of said enclosure from said inlet to said outlet thereof; heating means located in said enclosure for heating the fluid flowing therethrough so that heat will be transferred from the heated fluid through said wall means to the interior of the container to heat material in the latter; nozzle means communicating with said outlet so that the heated fluid flows from said outlet through said nozzle means; and conduit means leading from the interior of the container to said nozzle means for directing material from the interior of the container to said nozzle means to be sprayed from the latter with the heated fluid.

2. In a sprayer as recited in claim 1, said nozzle means being fixed to said enclosure.

3. In a sprayer as recited in claim 1, said heating means including electrical heating elements located in said enclosure for heating the fluid flowing therethrough and said fluid supply means including an elongated hollow tube communicating with said inlet for supplying a fluid to the interior of said enclosure, said heating means further including elctrical conductors located in the lumen of said elongated hollow tube and connected electrically with said heating elements for energizing the latter, the fluid flowing along the interior of said tube to said enclosure contacting said conductors.

4. In a sprayer as recited in claim 3, a plurality of baffles located in said enclosure for providing a zig-zag path along which the fluid flows through said enclosure.

5. In a sprayer as recited in claim 1, additional concuit means communicating with said outlet and said nozzle means to provide communication therebetween; and a superheating coil connected to and communicating with said additional conduit means and extending from the latter downwardly into the interior of the container for also heating material therein.

6. In a sprayer as recited in claim 1, a cover fluid-tightly covering and closing said container; and additional conduit means communicating with said outlet and terminating in the interior of the container at an upper portion thereof so that part of the fluid flowing from said outlet of said enclosure flows through said additional conduit means into the container to provide a fluid under pressure acting downwardly on the material in said container.

7. In a sprayer as recited in claim 6, a superheating coil also communicating with the outlet of said enclosure to be supplied with heated fluid flowing from said enclosure, said coil being carried by said cover and extending therefrom downwardly into the interior of the container, said nozzle and fluid supply means as well as both of said conduit means all being connected to and carried by said cover.

8. A unit adapted to be inserted into a container containing material to be sprayed for heating and spraying the material, said unit comprising, in combination, support means; wall means carried by and extending downwardly from said support means into the container during use of said unit, said wall means defining a hollow elongated enclosure having opposite closed ends and respectively formed adjacent said ends with an inlet leading into and an outlet leading out of said enclosure; fluid supply means communicating with said inlet and supplying a fluid to said enclosure in direct contact with said wall means, the fluid flowing through the interior of said enclosure from said inlet to said outlet thereof; heating means located in said enclosure for heating the fluid flowing therethrough so that the heat will be transferred from the heated fluid through said wall means to the interior of a container to heat material therein when the unit is in use; nozzle means carried by said support means communicating with said outlet so that the heated fluid flows from said outlet through said nozzle means; and conduit means also carried by said support means and extending from the latter downwardly into the interior of the container when the unit is used, said conduit means communicating with said nozzle means for directing material from the interior of the container to said nozzle means to be sprayed from the latter with the heated fluid when the unit is used.

9. A unit as recited in claim 8 and wherein said support means is in the form of a cover which is adapted to fluid-tightly cover and close a container for the material to be sprayed.

References Cited in the file of this patent

UNITED STATES PATENTS

| | | |
|---|---|---|
| Re. 23,551 | Axelson | Sept. 30, 1952 |
| 1,488,125 | Kline | Mar. 25, 1924 |
| 1,586,009 | Shelburne | May 25, 1926 |
| 1,587,736 | Schenck | June 8, 1926 |
| 1,792,551 | Rice | Feb. 17, 1931 |
| 2,274,839 | Marick | Mar. 3, 1942 |
| 2,717,804 | White | Sept. 13, 1955 |
| 2,788,337 | Preiswerk | Apr. 9, 1957 |

OTHER REFERENCES

Therm-O-Spray literature, received in Patent Office, March 3, 1952, Manufacturer: Svenska Masken AB Greiff, Stockholm, Sweden.